US009390300B2

United States Patent
Do Khac et al.

(10) Patent No.: US 9,390,300 B2
(45) Date of Patent: Jul. 12, 2016

(54) COEXISTENCE OF RF BARCODES AND OTHER NFC DEVICES

(71) Applicant: ST-Ericsson SA, Plan-les-Ouates (CH)

(72) Inventors: Minh Tri Do Khac, La Gaude (FR); Rajkrishna Pillai Ravindran, Singapore (SG)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/436,502

(22) PCT Filed: Oct. 18, 2013

(86) PCT No.: PCT/EP2013/071891
§ 371 (c)(1),
(2) Date: Apr. 17, 2015

(87) PCT Pub. No.: WO2014/060597
PCT Pub. Date: Apr. 24, 2014

(65) Prior Publication Data
US 2015/0278561 A1     Oct. 1, 2015

Related U.S. Application Data

(60) Provisional application No. 61/716,227, filed on Oct. 19, 2012.

(30) Foreign Application Priority Data

Oct. 18, 2012 (EP) ...................................... 12306293
May 29, 2013 (EP) ...................................... 13169820

(51) Int. Cl.
*H04B 5/00* (2006.01)
*G06K 7/10* (2006.01)

(52) U.S. Cl.
CPC ........ *G06K 7/10019* (2013.01); *G06K 7/10237* (2013.01); *G06K 7/10297* (2013.01); *H04B 5/0062* (2013.01)

(58) Field of Classification Search
CPC .......... G06K 7/10128; G06K 7/10297; G06K 7/10138; H04B 5/0062
USPC ....................................................... 455/41.1
See application file for complete search history.

(56) References Cited

U.S. PATENT DOCUMENTS 8,225,993 B2 *   7/2012   Jenkins ................... G06Q 40/00
                                                      235/379
2007/0218837 A1 *  9/2007   Lessing .................... H04B 5/02
                                                       455/41.2

FOREIGN PATENT DOCUMENTS

EP        1 431 904 A2    6/2004
EP        1 630 714 A2    3/2006

OTHER PUBLICATIONS

International Search Report issued in corresponding International application No. PCT/EP2013/071891, date of mailing of report Jan. 27, 2014.
Written Opinion of the International Searching Authority issued in corresponding International application No. PCT/EP2013/071891, date of mailing of the opinion Jan. 27, 2014.
Extended European Search Report issued in corresponding European application No. EP 13 16 9820, date of completion of the search Jan. 20, 2014.

* cited by examiner

*Primary Examiner* — Eugene Yun
(74) *Attorney, Agent, or Firm* — Patent Portfolio Builders PLLC

(57) ABSTRACT

An NFC-enabled device (12) comprising a host (22), an NFC interface (26) and an RF transceiver (24) configured to emit a first RF field (46) to power-up one or more in-range RF barcodes (16, 60), the NFC-enabled device (12) being configured to detect the presence of an RF barcode (16, 60) upon powering it up and being configured to read data (48, 62) from the one or more detected, in-range RF barcodes (16, 60), characterized by the NFC-enabled device (12) periodically (42) emitting the first RF field (46) and being configured to transmit only changes (64) in the read data (48, 62) from the or each RF barcode (16, 60) to the host (22). The invention therefore presents several advantages, namely: it can improve the user's experience by keeping the listen mode active, even in the presence of a nearby Kovio Tag; and it can save battery power by performing a periodic Kovio tag detection instead of a continuous one.

17 Claims, 2 Drawing Sheets

COEXISTENCE OF RF BARCODES AND OTHER NFC DEVICES

This invention relates to Near-Field Communication (NFC) and in particular, but without limitation, to the coexistence of different types of NFC device, such as RF barcode-type devices and another NFC-enabled device.

Near-field communication (NFC) is a short-range wireless communication technology that is used for exchanging data between devices over short distances of up to a few tens of centimeters. NFC is used in many types of so-called contactless devices, such as travel cards, credit cards and the like. In addition, NFC can be used in radio-frequency identification (RFID) applications whereby a reader device can detect and retrieve data from an NFC tag. RFID devices comprise an antenna, which is used for the transmission and reception of radio signals (data), and as an induction loop for powering the device, whereby the NFC tag is able to be powered by an RF induced current in its antenna as it resides within the RF field of the reader device.

NFC devices communicate via magnetic field induction whereby the loop antenna of the reader device and the loop antenna of the NFC device are located within each other's near field, effectively forming an air-core transformer. By such a configuration, it is possible to transmit data and power from one device to the other.

There are generally two modes of NFC: a passive communication mode whereby the initiating device provides a carrier field and the target device answers by modulating the carrier field; and an active communication mode where both the initiating and target devices communicate by alternately generating their own fields.

The target device can be a smartcard or a tag, but also more advanced devices, such as mobile phones can have NFC functionality whereby they "emulate" the behavior of an NFC tag. For this reason, when the target device operates in passive communication mode, this is usually called a "tag emulation mode" and the target device can be called a "tag emulator" or "transponder".

Such devices can communicate with one another according to operations and protocols defined by the ISO 14443 standard. A problem can arise, however, where more than one NFC reader and/or target are in range of one another, because this can lead to data collision and unnecessary bandwidth being used.

Specifically, certain types of passive NFC tags can cause coexistence problems in NFC scenarios. Specifically, one type of NFC tag, which is an RF barcode-type device developed and marketed by a company called Kovio™, (a "Kovio tag"), comprises a printed integrated circuit (PIC) comprising an antenna, a master circuit, a transponder and a 128-bit ROM. The ROM is loaded with a unique identification code (UID), and the device operates in a passive, read-only mode. As such, when the RF barcode enters the RF field of a reader device, it is powered-up and by an induction current in its antenna, and then proceeds to broadcast the UID continuously, or at intervals. In other words, the RF barcode operates in a Tags-Talk-First (TTF) mode, it does not accept any commands from a reader but rather, as soon as it receives enough power from the reader's field to operate, it repeatedly transmits its UID at a specific interval, as long as it is powered.

As such, until the RF barcode leaves the RF field, it will continue to broadcast its UID. Moreover, because the RF barcode cannot accept a power-down command from the reader device, to halt or pause the RF barcode's UID transmission, other NFC traffic between the host and NFC interface of the reader device, need to be synchronized, or truncated, to fit in the "off" periods of the RF barcode's transmission to avoid data collisions. This problem is particularly prevalent where there are multiple RF barcodes present in the RF field, whereby the RF barcode's UID transmissions can overlap, or do not leave enough "off" time for other NFC-enabled devices to operate effectively.

At present, there are no guidelines for reading RF barcode-type devices alongside other NFC reader modes or card emulation modes, and the fact that the RF barcode, by design, continuously or repeatedly broadcasts its UID, can cause data collisions or adversely affect the stability of the reader device. A need therefore exists for a solution that makes it possible for RF barcode-type devices to coexist with other types of NFC devices, for example, enabling RF barcodes and other ISO 14443-compliant devices to cohabit and interoperate in parallel with a common reader device.

According to a first aspect of the invention, there is provided an NFC-enabled device comprising a host, a near filed communication (NFC) interface and a radiofrequency (RF) transceiver operable in a first mode of operation of the NFC-enabled device to emit a first RF field to power-up one or more in-range RF barcode-type devices, the NFC-enabled device being configured to detect the presence of an in-range RF barcode-type device upon powering it up and being configured to read data from the one or more detected in-range RF barcode-type devices, wherein the NFC-enabled device is adapted to periodically emit the first RF field and is configured to transmit only changes in the data read from the or each RF in-range RF barcode-type device to the host.

According to a second aspect of the invention, there is provided a method for an NFC-enabled device comprising a host, a near filed communication (NFC) interface and a radiofrequency (RF) transceiver to interact with an RF barcode-type device, comprising the steps of:

emitting a first RF field to power-up one or more in-range RF barcode-type devices;

detecting the presence of an in range RF barcode-type device upon powering it up;

reading data from the one or more detected in-range RF barcode-type devices;

periodically emitting the first RF field; and, transmitting only changes in the read data from the or each RF barcode-type devices to the host.

Suitably, the NFC-enabled device comprises an NFC reader device that is operable in a poll or listen mode. The NFC-enabled device is suitably operable in a second mode, whereby a second RF field is emitted by the RF transceiver for interacting with non-RF barcode NFC devices. Suitably, the NFC-enabled device is configured to operate selectively and/or alternately in the first RF field and second RF field transceiving modes, which may help to resolve data conflicts between RF barcode-type devices and non-RF barcode type devices (conventional NFC devices) in-range of the NFC-enabled device simultaneously.

In an embodiment of the invention, the RF barcode comprises a Kovio tag. The read data from the RF barcode-type device suitably comprises a UID of the RF barcode, although the read data could comprise any other data type of data broadcast by the RF barcode-type device.

In an embodiment of the invention, the repeated transmission of the read data from the in-range RF barcode-type device or devices to the host can be reduced by providing a buffer memory for storing the read data from the or each RF barcode. The buffer memory is suitably configured to temporarily store the read data from the in-range RF barcode-type devices: when a new RF barcode-type device enters the RF field, its read data can be added to the buffer memory, and when an RF barcode-type device leaves the RF field, its read data can be deleted from the buffer memory. By such a configuration, the host can be configured to periodically read the buffer memory to detect changes therein.

In one embodiment, such a configuration enables the host to read the in-range RF barcode-type devices read data on-demand, rather than having the read data sent to the host repeatedly, which can free-up the host to interact with other NFC enabled devices.

In an alternative embodiment, the NFC-enabled device is configured to maintain an up-to-date record of in-range RF barcode type devices and their respective read data, and to transmit a delta signal (indicating a change to the content of the buffer memory) when a new RF barcode device comes into range, or when a previously detected RF barcode device goes out of range. Such a configuration allows the host to decide whether to acknowledge the change straight away, and to read the buffer memory, or whether to defer such action until it wishes to do so. This may enable the host to better prioritize its interactions with the NFC controller, say by prioritizing RF barcode devices over other NFC-enabled devices, or vice-versa. To facilitate this, a dedicated delta signal channel may be provided between the host and the NFC controller.

Preferred embodiments of the invention shall now be described, by way of example only, with reference to the accompanying drawings in which.

Figure 1:
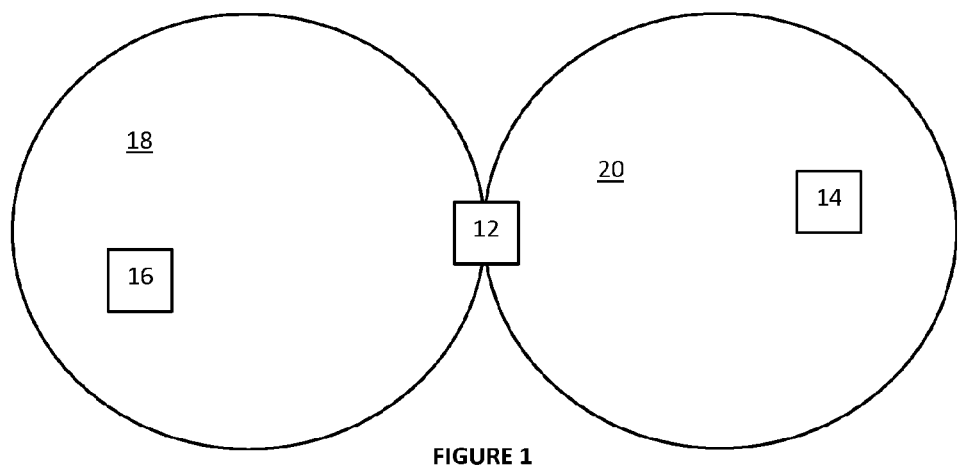
FIG. 1 is a schematic showing a context in which embodiments of the invention can be deployed.

Referring now to the drawings, FIG. 1 shows, schematically, an NFC environment 10 in which a first NFC enabled device in poll mode 12 is located within range of a conventional NFC-enabled device 14 in listen mode and an RF barcode-type NFC device 16. Each device has a range, illustrated in FIG. 1 by the boundaries 18, 20, wherein boundary 18 is the effective communications range of the RF barcode device 16, and wherein boundary 20 is the effective communications range of the listen mode NFC device 14. In the present context, the boundaries are the "vicinities" of the respective devices, which may depend on the intensity of the generated current flowing through the antennas of the devices and on their characteristics. The boundaries 18, 20 can be discrete, as shown, or they can overlap.

The RF barcode-type device 16 can be a "Kovio" tag, but the invention should be understood more generally as related to any RF barcode having similar functionalities as a Kovio tag.

Figure 2:
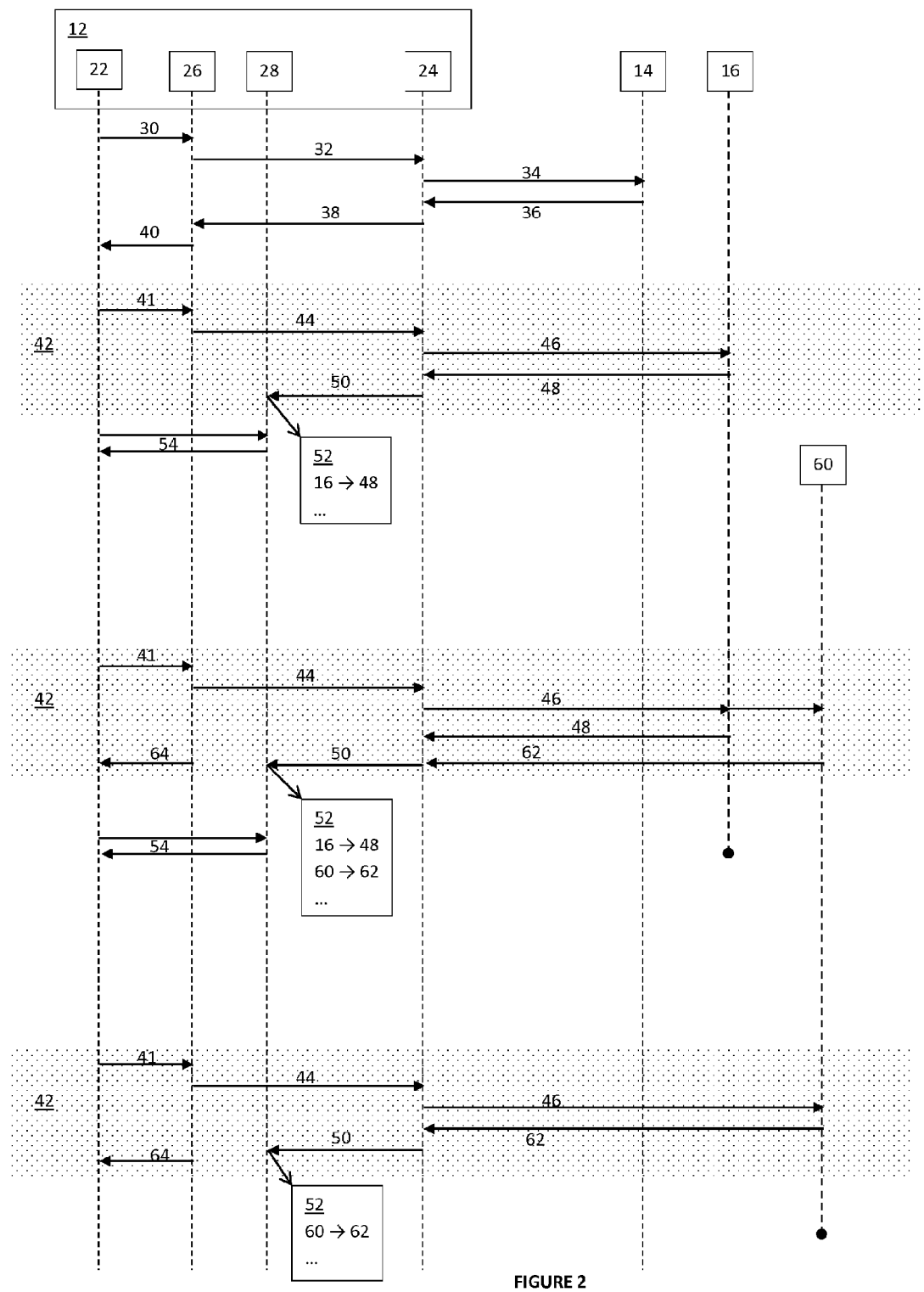
FIG. 2 is a schematic signaling diagram for the invention.

FIG. 2 is a signaling diagram illustrating, schematically, how the invention allows the NFC listen mode device 14 and one or more RF barcode-type device 16 to coexist. In FIG. 2, the poll mode device 12 comprises a host 22 that interacts with an RF transceiver 24 via an NFC interface (NCI) 26. The poll mode device 12 additionally comprises a buffer memory 28 associated with the NFC interface 26.

The poll mode device 12 and listen mode 14 NFC devices can interact in a known manner, as shown in FIG. 2, by the host sending a "connect" command 30 to the NCI 26, whereupon the NCI 26 instructs 32 the transceiver 24 to broadcast an RF signal 34 to the listen mode NFC device 14. The NFC device 14 responds by sending data 36 wirelessly to the transceiver 24, which data is passed back to the host 22, via the NCI 26 via internal signaling 38, 40. This process can be repeated to allow data exchange between the poll mode device 12 and the listen mode device 14 in a manner that is well known to the skilled reader.

Meanwhile, an RF barcode-type device 16 is within range of the poll mode device's 12 transceiver 24, but no action is taken for the time being.

At pre-determined intervals, or by a command 41 of the host 22, the poll mode device 12 enters an RF barcode detection period 44. The host 22 thus instructs the NCI 26 to seek in-range RF barcode devices 16, and the NCI 26 commands 44 the transceiver 24 to search for in-range RF barcode devices 16. The transceiver 24 therefore emits a first signal 46 that is sufficient to power-up the RF barcode device 16, and the RF barcode device responds 48 by broadcasting its UID 48 and/or any other data/information it may emit in future releases. The transceiver 24 receives the UID (or data) 48 and stores 50 it in a table 52 of the buffer memory 28, which lists the UIDs 48 of all of the detected in-range RF barcode devices 16. The RF barcode detection period 44 then ends, and the poll mode device 10 re-enters a normal NFC mode whereby it can communicate with NFC-enabled devices 14 in the usual way.

Now, if the host, user or application wants to determine the UID or data 48 of the in-range RF barcode devices 16, it simply interrogates 54 the buffer memory directly, or via the NCI 26 and reads the UIDs or data 48 for each detected in-range RF barcode device 16.

At a later point in time, the poll mode device 12 re-enters the RF barcode detection period 44, and the process described above is repeated. As can be seen in FIG. 2, now a second RF barcode device 60 has come into range, and so when the transceiver 24 emits its first signal 46 again, two RF barcode devices 16, 60 are powered-up, and each responds 48 by broadcasting its UID 48, 62. The transceiver 24 receives the UIDs 48, 62 and stores 50 them in the table 52 of the buffer memory 28. This time, a change has occurred, that is to say, a second UID 62 has been added to the table 52, and so the NCI 26 sends a delta signal 64 to the host 22, which alerts the host 22 to a change in the table 52.

The host 22 can respond by querying 54 the table 52, or it can simply note the delta signal and defer taking action until it needs to take some action.

Also shown in FIG. 2 is a later instant in time, whereby on the RF barcode devices 16 has moved out of range. This is not immediately detected, but the next time the poll mode device 12 re-enters the RF barcode detection period 44, the table 52 is updated, and a delta signal 64 is sent to the host 22 to notify the host 22 of a change. Thus, the host 22 can then immediately interrogate the 54 the table, or, as is shown in FIG. 2, defer doing so until it has finished interacting with other in-range NFC devices 14.

As such, the invention frees-up the host 22 to interact with the devices 16, 16, 60 of its choosing, rather than being constantly bombarded with updates and UIDs, which frees-up system resources and reduces data collisions within the poll mode device 12.

Specifically, when an RF barcode device is detected, and its UID determined, the UID can be transmitted to the host. Nevertheless, even though the RF barcode device or devices 16, 60, continuously broadcast their UIDs 48 62 within the load field, the device 12 does not transmit it continuously to the host but, preferably, only once, after its determination.

Figure 3:
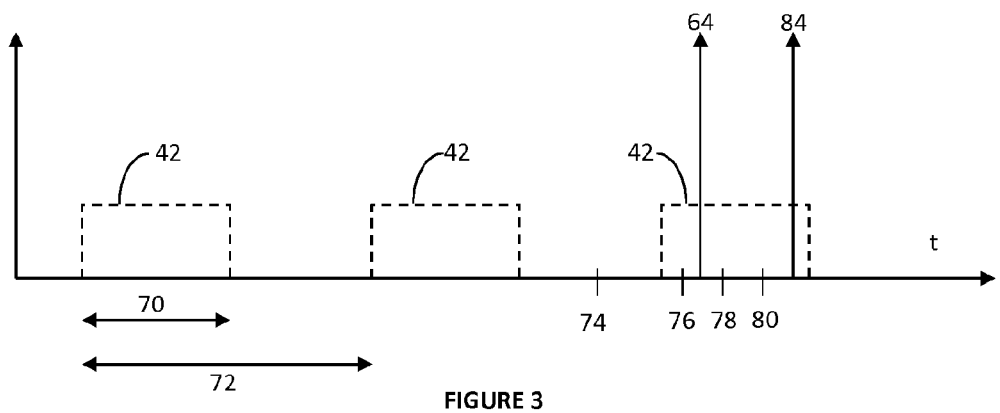
FIG. 3 shows a schematic time line of a first scenario representative of FIG. 2, from the perspective of the chip of the poll mode device 12.
Figure 4:
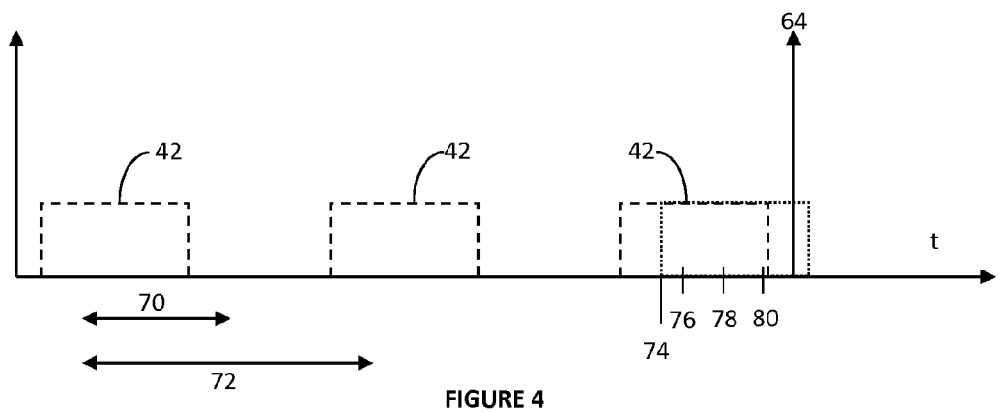
FIG. 4 shows a schematic time line of a second scenario representative of FIG. 2, from the perspective of the chip of the poll mode device 12.

FIGS. 3 and 4 show schematic time lines representative of FIG. 2, from the perspective of the chip of the poll mode device 12.

An RF barcode detection phase 42 is performed periodically, the phase being characterized by parameters that determine its length 70 and its period 72. In the Example of FIG. 3, the RF barcode device 16 moves within the vicinity 18 instant 74. The RF barcode device 16 cannot be detected immediately but during the next RF barcode detection phase 42 phase, for instance at instants 76, 78 . . . 80. The RF barcode 16 continuously emits its UID 48, and it will therefore be detected several times by the chip of the poll mode device 12.

In a first situation, the RF barcode devoice 16 is detected for the first time at the instant 76, which triggers a delta signal 64 to be passed to the host 22 (that is to say, to the application layer) containing at least the received UID 48 of the detected RF barcode device 16. The next detections at the chip level do not trigger any messages passed to the host 22.

In a second situation, the signal received from the RF barcode device is in error: the received signal 48 contains the UID and cyclic redundancy check (CRC) field, which guaranties that the receiver (12) can detect transmission errors. In such a case, at the times 76, 78 . . . 80, the chip is not able to determine the UID. At the end of the RF barcode detection phase 42, a message 84 can be passed to the host 22, indicating that an error happened.

When the delta signal 64 and verification message 84 are sent to the application layer, or when a timer associated to the RF barcode detection phase 42 expires, the device 12 can switch out of the RF barcode detection phase 42 and move to another phase in which it can poll or listen, according to other radio-frequency technology.

For instance, it can then interact with an NFC device 14 present in the vicinity 20. In this example, the NFC device 14 is not close to the RF barcode devoice 16, and is not, therefore, perturbed by its continuous transmission of its UID. It can then normally interact with the poll mode device 12, when this device 12 is not in RF barcode detection phase 42. More precisely, the poll mode device 12 can initiate a peer-to-peer communication with the listen mode device 14. Such communication is suitably compliant with the relevant standards, such as ISO 14443.

FIG. 4 illustrates another example where the RF barcode device 16 is moved (or switched on) inside the vicinity 18 during a RF barcode detection phase 42 at instant 74. In this situation, the first bytes of the signal sent by the RF barcode device 16 are received by the chip of the device 12. According to an embodiment of the invention, the timer associated with the RF barcode detection phase 42 is reset, so as to allow sufficient time for the detection of the RF barcode device 16. This helps to settle any radio-frequency errors if the RF barcode device 16 is moved too slowly into the RF field, for instance.

In FIG. 4, the RF barcode detection phase extension is represented by a second dotted block 43, of same length 70 of the first one but beginning at instant 74. The actual RF barcode detection phase 42 is therefore extended to include both blocks 42, 43: its length being longer than 70 by the interval between the start of the normal block 42 and the instant 74. Once the RF barcode 16 has been detected, as previously described, a delta signal 64 is passed to the application layer, containing at least the received UID.

Although the UID is received many times by the chip during the RF barcode detection phase 42, only one message 82 is passed to the application layer or host 22. The delta signal 64 can be notified as soon as the first detection is performed (without error) or at any time of the RF barcode detection phase 42 is at its end.

If a new RF barcode device 60 is detected, a new notification 64 is sent to the application layer or host 22, but notably the delta signal 64 is sent only once for each detected RF barcode device 16, 60.

Even after having sent the UID to the application layer, the chip continues to check the presence of the RF barcode devices, so that the buffer memory 28 can be cleared as soon as the RF barcode device 16, 60 disappears from the RF field.

As previously explained, the invention allows the device 12 to communicate both with a "Kovio Tag" or RF barcode device 16, 60 and with another NFC device 14.

It has been established by the inventors that Card Emulation for other NFC technologies is possible in parallel of the "Kovio Tag" traffic. This is done by using a timer associated to the Kovio Tag detection phase: Kovio polling is done for, for instance for 4 to 5 ms and if there is no Kovio Tag in the vicinity and if is requested by the application layer (and/or by the user) then the device 12 starts card emulation in listen mode. Card emulation can be executed because an external reader can be out of the vicinity 18 of the Kovio Tag 16 and consequently not disturbed by it, while the usual and legacy mechanism would have been to poll for the Kovio tag 16 continuously.

The invention therefore presents several advantages, namely: it can improve the user's experience by keeping the listen mode active, even in the presence of a nearby Kovio Tag; and it can save battery power by performing a periodic Kovio tag detection instead of a continuous one.

The invention has been described with reference to preferred embodiments. However, many variations are possible within the scope of the invention.

The invention claimed is:

1. An NFC-enabled device comprising a host, an NFC interface and an RF transceiver configured to emit a first RF field to power-up one or more in-range RF barcodes, the NFC-enabled device being configured to detect the presence of an RF barcode upon powering it up and being configured to read data from the one or more detected, in-range RF barcodes, characterized by the NFC-enabled device periodically emitting the first RF field and being configured to transmit only changes in the read data from the or each RF barcode to the host, wherein the NFC-enabled device is operable in a second mode, whereby a second RF field is emitted by the RF transceiver for interacting with non-RF barcode NFC devices.

2. An NFC device or method as claimed in claim 1, wherein the NFC-enabled device is configured to operate selectively and/or alternately in the first RF field and second RF field transceiving modes.

3. An NFC device or method as claimed in claim 1, wherein the RF barcode comprises a Kovio™ tag.

4. An NFC device or method as claimed in claim 1, wherein the read data from the RF barcode-type device comprises a UID.

5. An NFC device or method as claimed in claim 1, wherein the NFC device further comprises a buffer memory for storing the read data.

6. An NFC device or method as claimed in claim 5, wherein the buffer memory is configured to temporarily store the read data from the in-range RF barcode-type devices, and wherein, when a new RF barcode-type device enters the RF field, its read data is added to the buffer memory, and when an RF barcode-type device leaves the RF field, its read data is deleted from the buffer memory.

7. An NFC device or method as claimed in claim 5, wherein the host is configured to periodically read the buffer memory to detect changes therein.

8. An NFC device or method as claimed in claim 5, wherein the NFC-enabled device is configured to maintain an up-to-date record of in-range RF barcode type devices and their respective read data, and to transmit a delta signal indicating a change to the content of the buffer memory when a new RF barcode device comes into range, or when a previously detected RF barcode device goes out of range.

9. An NFC device or method as claimed in claim 8, wherein a dedicated delta signal channel is provided between the host and the NFC controller.

10. An NFC device or method as claimed in claim 1, wherein the poll mode device and listen mode NFC device interact by the host sending a connect command to the NCI, the NCI instructing the transceiver to broadcast an RF signal to the listen mode NFC device, the NFC device responding by sending data wirelessly to the transceiver, which data is passed back to the host, via the NCI using internal signaling.

11. An NFC device or method as claimed in claim 1, wherein an RF barcode detection phase is performed periodically.

12. An NFC device or method as claimed in claim 11, wherein the periodicity of the RF barcode detection phase is constant.

13. An NFC device or method as claimed in claim 11, wherein the duration of the RF barcode detection phase is of a nominal length.

14. An NFC device or method as claimed in claim 13, wherein the duration of the RF barcode detection phase is extendable to a duration ending at a time equal to the nominal length following the detection of an RF barcode device.

15. An NFC device or method as claimed in claim 1, wherein the read data from the RF barcode device comprises an UID and a CRC field.

16. An NFC device or method as claimed in claim 15, whereupon detection of an error in the read data at, or towards the end of the RF barcode detection phase, an error message is sent to the host.

17. A method for an NFC-enabled device comprising a host, an NFC interface and an RF transceiver to interact with an RF barcode-type device and an NFC-enabled device, comprising the steps of: emitting a first RF field to power-up one or more in-range RF barcodes; detecting the presence of an RF barcode upon powering it up; reading data from the one or more detected, in-range RF barcodes, characterized by: periodically emitting the first RF field and transmitting only changes in the read data from the or each RF barcode to the host, wherein the NFC-enabled device is operable in a second mode, whereby a second RF field is emitted by the RF transceiver for interacting with non-RF barcode NFC devices.

\* \* \* \* \*